United States Patent [19]

Rehfuss et al.

[11] Patent Number: 4,521,489

[45] Date of Patent: Jun. 4, 1985

[54] LOW TEMPERATURE CURE COATING SYSTEM SUITABLE FOR METAL AND PLASTIC SUBSTRATES

[75] Inventors: John W. Rehfuss; Louis S. Hazelwood; Martin B. Price; Robert W. Zilke, Jr., all of Louisville, Ky.

[73] Assignee: Reliance Universal, Inc., Louisville, Ky.

[21] Appl. No.: 619,699

[22] Filed: Jun. 13, 1984

Related U.S. Application Data

[63] Continuation of Ser. No. 470,782, Mar. 1, 1983, abandoned, which is a continuation-in-part of Ser. No. 348,604, Feb. 12, 1982, abandoned.

[51] Int. Cl.[3] .............................................. B32B 27/36

[52] U.S. Cl. .................................... 428/412; 427/409; 427/412.1; 427/412.5; 428/461; 428/483; 428/500; 428/502; 428/505; 428/515; 428/519; 428/521; 428/522

[58] Field of Search ............... 428/461, 483, 412, 515, 428/519, 500, 521, 522, 505, 502; 427/409, 412.5, 412.1

[56] References Cited

U.S. PATENT DOCUMENTS

| | | | |
|---|---|---|---|
| 3,959,202 | 5/1976 | Blank | 260/29.4 UA |
| 4,106,421 | 8/1978 | Haag et al. | 113/120 A |
| 4,208,465 | 6/1980 | Chang | 428/416 |

*Primary Examiner*—Theodore E. Pertilla

*Attorney, Agent, or Firm*—Donald L. Cox

[57] ABSTRACT

A low temperature cure coating system exhibiting high performance characteristics, particularly solvent resistance and impact resistance, which is capable of being applied to either metal or plastic substrates. Dissimilar topcoat and basecoat compositions are employed, the topcoat being an aqueous polymeric dispersion, acid catalyzable for curing at temperatures of 150° F. and below while the basecoat is selected for compatibility with the topcoat and the substrate, either the metal or plastic, to give proper adhesion, flexibility, film integrity and lack of interference with topcoat performance.

1 Claim, No Drawings

LOW TEMPERATURE CURE COATING SYSTEM SUITABLE FOR METAL AND PLASTIC SUBSTRATES

RELATED APPLICATION

This application is a continuation of application Ser. No. 470,782, filed Mar. 1, 1983, now abandoned, which is a continuation-in-part of copending application Ser. No. 348,604 filed Feb. 12, 1982, now abandoned.

BACKGROUND OF INVENTION

Many original equipment manufacturers of products such as toys, typewriters, appliances, desks and other office equipment have established very demanding performance characteristics for the coatings used on their products. At the present time, these performance characteristics are capable of being met only with high temperature cure coatings, and both solvent-based and water-based compositions are currently available for this purpose. As these manufacturers broaden their choice of substrates from steel and aluminum into a variety of plastic materials, it becomes unacceptable to use high temperature cure coatings. This is because the plastics typically used, such as Noryl synthetic thermoplastic resins, Lexan polycarbonate resins, polystyrene, ABS and injection molding grade polyesters, are thermoplastic and tend to soften and deform at the temperatures of 300° F. and higher that are required to cure the existing coating compositions. Moreover, most such coatings are solvent-based and, for environmental reasons, it is preferred to use aqueous-based compositions to avoid the pollution problems associated with solvent-based compositions.

Typical performance characteristics that must be possessed by a topcoat composition for many of these products include texturing capability, resistance to solvents such as 1,1,1-trichloroethane commonly used as an ink stain cleaner and adhesive remover, impact resistance, gloss level, hardness, dry adhesion and humidity resistance, as well as other known performance characteristics. The coating properties that would give satisfactory performance for solvent resistance (hardness) and impact resistance (flexibility) are generally the hardest to achieve simultaneously in a coating composition because they tend to be somewhat incompatible in nature. Additionally, satisfactory adhesion to a variety of metal and plastic substrates is a difficult problem to resolve when using aqueous compositions which are considered desirable to employ for environmental control reasons.

In copending application Ser. No. 06/459,417, filed Feb. 24, 1983, now abandoned entitled "Aqueous Coating Composition Comprising a Dispersion of Polymerized Unsaturated Monomers, a Nonionic Surfactant and Crosslinking Agent" and assigned to the assigned the assignee of the present invention, there is disclosed and claimed a topcoat and emulsion which is capable of exhibiting the desired performance characteristics and is also advantageous for use in association with thermoplastic substrates because of its low curing temperature, e.g. 150° F. However, while it may in some cases be used as both the base coat and topcoat on certain substrates, such as Lexan polycarbonate and Noryl synthetic thermoplastic resins, it lacks proper adhesion on polyester substrates. Moreover, because it is strongly acid catalyzed, it is not appropriate for direct application to metal substrates on which corrosion would result from the presence of the acid catalyst.

It is therefore an object of the present invention to provide a low temperature cure coating system capable of exhibiting high performance characteristics and which is compatible with both metal and plastic substrates.

This and other objects of the invention will become apparent in the course of the following disclosure.

SUMMARY OF THE INVENTION

In accordance with the invention, there is provided a low temperature cure coating system for metal and plastic substrates comprising a base coat and a topcoat of dissimilar compositions, wherein the basecoat composition is selected from the group consisting of non-acid catalyzed polymer and thermoplastic polymer materials having a glass transition temperature in the range of about 21°-51° C. and a minimum film forming temperature range of from about 10° C. to about 55° C.

The topcoat of the novel system is an aqueous composition comprising about 52-78.5% by weight of a dispersion of polymerized ethylenically unsaturated monomers including a plurality of non-functional and functional monomers together having a combined glass transition temperature in the range of about 26°-60° C., wherein the functional monomers are reactable with external crosslinking agents in the presence of an acid catalyst to form a coating at temperatures below about 66° C. and consist of (a) an hydroxyl functionality for crosslinking agents in the range of about 3-10% by weight of the total monomer composition, (b) an amide functionality for rheological characteristics in the range of about 4-9% by weight of the total monomer composition and (c) an acid monomer in the range of about 0-2.0% by weight of the total composition. The topcoat composition further comprises about 1.5-8% by weight of a surfactant, 50-100% of the particle charges of which are nonionic, the amount of the surfactant in the composition being sufficient to render the composition dispersion stable throughout the pH range of about 1.0-10. The topcoat composition further includes about 20-40% by weight of a crosslinking agent comprised of a substituted amide alone or in mixture with up to about 50% by weight of a high solids, highly alkylated polymeric methoxy methylated substituted amine, the amide and amine being alkoxylated and etherified, as needed, to impart characteristics of water miscibility and stability to gelation upon acid catalysis for extended time periods.

In the process of applying the coating system as just described, the topcoat can be strongly acid catalyzed for rapid curing, typically in about thirty minutes, at a temperature of about 150° F. which is below the softening temperature of thermoplastic substrates employed. One feature of the coating composition useful in this invention is that the relatively high level of amide functionality coupled with the presence of a predominantly nonionic surfactant allows the use of a substantial amount of acid catalyst desired to bring the pH of the composition down to the range of 1.0-2.0 without adversely affecting the stability of the emulsion.

Having thus provided a topcoat which is usable at temperatures low enough to be useful in association with thermoplastic substrates, it is desirable from the coating system standpoint to be able to apply the topcoat to a broad range of substrates, including steel and aluminum, and because the acid catalyst in the topcoat would encourage corrosion of the metal substrate if used directly on the substrate, a basecoat of dissimilar material is employed to enhance the necessary system coating performance characteristics while at the same time protecting the substrate from the effects of the acid catalyst. A wide variety of basecoats are available that will serve to isolate the acid catalyzed topcoat from the substrate; however, in order to achieve the required high performance characteristics of the overall coating system, it has been found that the basecoat composition should have a glass transition temperature and minimum film forming temperature falling within the ranges described above.

DETAILED DESCRIPTION

The use of a thermosetting polymeric emulsion in a suspendant offers coating process advantages firstly because it eliminates environmentally undesirable solvents and secondly because the use of monomers that are externally crosslinkable with an appropriate crosslinking agent in the presence of a strong acid catalyst offers the capability of curing in reasonable time periods at temperature levels suitable for use with thermoplastic substrates. In order that the emulsion be usable with metal substrates it is preferred that a two coat paint system be employed in which the initial or base coat is comprised of a suitable non-acid-catalyzed water-based polymer. An example of a suitable base coat for this purpose is a mixture in approximately equal proportions of two commercially available acrylic emulsions MV-9 and WL-91 made by Rohm and Haas Company. Individually, these coating compositions have each been found to be unsuitable to satisfy the requirements of a basecoat for the high performance needs contemplated by this invention. However, when combined in approximately equal proportions, between 20–50% of MV-9 and 80–50% of WL-91, it was discovered that proper adhesion, flexibility, film integrity and lack of interference with topcoat performance was achieved. Emulsion MV-9 is reported to have a glass transition temperature $T_g$ of +28° C. and a minimum film forming temperature MFFT in the range of 30°–45° C. while emulsion WL-91 has a $T_g$ of +58° C. and an MFFT in the range of 47°–57° C. When combined in the proportions indicated, the basecoat emulsion has a $T_g$ in the range of about 21°–51° C. and an MFFT range of about 10°–55° C. Equivalent acrylic emulsions having a $T_g$ and an MFFT in these ranges are considered to give comparable results as a base coat in this system. For plastic substrates, excellent performance has been observed when using a base coat acrylic emulsion available under the designation "A-655" from Polyvinyl Chemical Industries of Wilmington, Mass.

In preparing the topcoat emulsion, suitable ethylenically unsaturated monomers are selected and employed to provide the required characteristics of topcoat performance, such as impact resistance (flexibility), scratch resistance (hardness), solvent resistance (hardness), dry adhesion, humidity resistance and the like. Suitable non-functional monomers and comonomers that can be used include esters of acrylic acid or methacrylic acid with an alcohol having 1–18 carbon atoms, e.g. methyl acrylate or methacrylate which may be generically represented by the expression methyl(meth)acrylate, ethyl(meth)acrylate, propyl(meth)acrylate, isopropyl(meth)acrylate, n-butyl, sec-butyl, iso-butyl, or tert-butyl(meth)acrylate, hexyl(meth)acrylate, lauryl(meth)acrylate, stearyl(meth)acrylate; acrylonitrile, methacrylonitrile, styrene, vinyltoluene, vinyl chloride, vinylidene chloride, vinyl esters of alkanoic acids having 1 to 18 carbon atoms, e.g. vinylformate, vinyl acetate, vinyl propionate, vinyl butyrate, vinyl pentanoate, and vinyl hexanoate, vinyl laurate, and vinyl stearate. The non-functional portion of the copolymer may contain two or more of such comonomers, e.g. both methyl methacrylate and ethyl or butyl acrylate, styrene and ethyl or butyl acrylate, or acrylonitrile and ethyl or butyl acrylate.

In most cases it will be necessary to select a suitable combination of monomers with a view to achieving the desired performance characteristics. To this end, the addition of styrene is preferred for its known hardness characteristic and also for a degree of solvent resistance. Methylmethacrylate is also desirable to provide hardness and some solvent resistance. Butyl methacrylate and ethylacrylate are suitable additions to provide softening or flexibilizing of the cured coating that imparts desired impact resistance. While the styrene and methylmethacrylate components were useful in providing some degree of solvent resistance, it is an important feature of the invention that it was found necessary to include an hydroxyl functionality, preferably hydroxyethylmethacrylate to serve as a primary crosslinking site to provide the high degree of solvent resistance in the coating applications contemplated by this invention. Additionally, the emulsion includes an amide functional monomer, such as acrylamide or methacrylamide, to provide stability of the emulsion with the particular surfactants used in the emulsion. This component also imparts desired rheological characteristics to the coating composition, e.g. minimizing of sagging of the coating prior to curing.

An acid functional monomer may be included optionally if needed to aid in stabilization during synthesis of the emulsion, in the range of about 0–2.0% by weight of the monomer composition. Examples of monomers containing a carboxyl group useful for this purpose are: sorbic, cinnamic, vinyl furoic, α-chlorosorbic, p-vinylbenzoic, acrylic, methacrylic, maleic, fumaric, aconitic, atropic, crotonic and itaconic acids, or mixtures thereof, with itaconic acid and the α,β-unsaturated monocarboxylic acids, particularly methacrylic acid being preferred. Other copolymerizable acid monomers include the alkyl half esters or partial esters of unsaturated polycarboxylic acids such as of itaconic acid, maleic acid and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate and butyl acid maleate.

It will be appreciated that the terms functional and non-functional as used in the context hereof refers to the potential for crosslinking to occur after formation of the polymeric emulsion with an external crosslinking agent.

In combining these ethylenically unsaturated monomers in the emulsion, it was found to be important that the relative amounts of the monomers be proportioned to achieve a combined glass transition temperature falling within the range of about 26°–60° C. and preferably within the range of about 38°–49° C. in order to achieve an appropriate balance between the softness needed to realize the extensibility required for impact resistance and the hardness required for scratch resistance.

The surfactant used in the preparation of the topcoat emulsion is one in which the majority of the particle charges are nonionic and preferably one in which greater than 80% of the particle charges are nonionic. Ideally, the surfactant would be entirely nonionic although it has been found that suitable results are obtained with some degree of anionic and/or cationic charges present. In practice, a combination of surfactants has been found to be advantageous wherein surfactants having different hydrophilic-lipophilic balances are combined to achieve the desired results. The amount of surfactant used is not particularly critical except that it is included in sufficient degree to render the composition dispersion stable throughout a pH range of 1.0–10. About 1.5–8% by weight is good.

The functional monomers used in the emulsion, as previously indicated, are not self-crosslinking and therefore rely on an external crosslinking agent for curing to occur. In the preparation of the present coating composition utilizing the above described emulsion, a crosslinking agent is employed which consists essentially of a substituted amide or a mixture of a substituted amide with up to about 50% by weight of the mixture of a high solids, highly alkylated, polymeric methoxy methylated substituted amine. The amide and, if used, the amine should be alkoxylated and/or etherified, as needed, to impart to the resultant coating composition the characteristics of water miscibility and stability to gellation upon acid catalysis. It is highly desirable in commercial usage to have stability for extended time periods, such as at least eight hours, in order, for example, to allow excess composition remaining at the end of a work shift to be kept and used in a subsequent shift or the following day. It is one feature of the present invention that such extended time periods of stability are possible, although it will be appreciated that shorter periods of stability can be provided for and be acceptable in some cases.

A preferred crosslinking agent is a mixture of methoxymethyl urea and melamine, the melamine being included in a range of about 30–50 of the agent mixture. A fairly wide range in the amount of the crosslinking agent in the coating composition is permissible, suitable ratios being in the range of about 60–80 wt. percent of the emulsion to about 20–40 wt. percent of the selected crosslinking agent. The crosslinking agent preferably is included at well above stoichiometric levels of the hydroxyl monomer in the emulsion. It has been found that with this composition the excess methoxymethyl urea reacts with itself by self condensation to give enhanced solvent resistance in the cured coating. Thus, there is in some measure an added improvement in performance characteristics achieved from using an hydroxyl component in the emulsion with the methoxymethyl urea in the formulation of the present coating composition.

EXAMPLE I

A surfactant mixture was prepared consisting of 22 gms of nonionic emulsifier based on ethoxylated nonylphenols having a hydrophilic-lipophilic balance (HLB) of 17.8 and containing 40 moles of ethylene oxide, 8 gms of nonionic emulsifier based on ethoxylated nonylphenols having an HLB of 10.8 and containing 6 moles of ethylene oxide and 7 gms of sodium lauryl sulfate all of which were dissolved in 391 gms of water in a glass resin flask equipped with a stirrer, thermometer, nitrogen inlet tube, monomer addition inlet and reflux condenser. The flask was flushed with nitrogen to purge the vessel of oxygen and the mixture was heated to 155° F.

A monomer mixture was then prepared as a pre-emulsion by stirring together in a flask 120 gms of water, 9 gms of nonionic emulsifier based on ethoxylated nonylphenols having an HLB of 17.8 and containing 40 moles of ethylene oxide, 3 gms of nonionic emulsifier based on ethoxylated nonylphenols having an HLB of 10.8 and containing 6 moles of ethylene oxide, 26 gms of acrylamide, 11 gms of methacrylic acid, 49 gms of styrene, 50 gms of methylmethacrylate, 180 gms of butyl methacrylate, 21 gms of hydroxyethyl methacrylate and 37 gms of ethyl acrylate. The mixture was stirred about ten minutes at ambient temperature to obtain the pre-emulsion condition.

An initiator solution was prepared by dissolving 0.75 gms of ammonium persulfate in 25 gms of water. An activator solution was prepared by dissolving 0.16 gms of sodium metabisulfate in 25 gms of water. Ten volume percent of the initiator solution, pre-emulsion and activator solution were charged to the glass resin flask containing the surfactant mixture and the remainder was placed in a graduated burette and calibrated for continuous feeding. The reaction temperature in the flask was allowed to exotherm to 165°–170° F. and after 15–20 minutes of seeding was cooled to 150° F. The remainder of the pre-emulsion, initiator and activator solutions were then added dropwise to the resin flask over the course of 210 minutes with the temperature controlled to 150°–155° F.

Upon completion of the addition of the pre-emulsion, initiator and activator solutions, a separate solution was prepared consisting of 0.2 gms of t-butyl hydroperoxide mixed with 0.2 gms of water and 0.2 gms of nonionic emulsifier based on ethoxylated nonylphenols having an HLB of 17.8 and containing 40 moles of ethylene oxide which was then added dropwise to the resin reactor. The emulsion was post heated at 150°–160° F. for one hour or until the residual monomer was less than 0.25% as measured by either morpholene titration or gas chromatography. The pH value of the reaction mix was between 2.5 and 3.5. The solids content was 40% and viscosity was 1700 cps.

A topcoat paint mixture was then formulated based on the Example I emulsion described above. On a separator Cowles mixer, a pigment slurry was prepared by charging 36 gms of water, 12 gms of butyl carbitol, 12 gms of isopropanol, 21 gms of polyvinylpyrolidone, 6 gms of an amphoteric sulfonated surfactant, 2 gms of nonionic emulsifier based on ethyoxylated octylphenol containing 40 moles of ethylene oxide and 4 gms of defoamer. To this mixture, 66 gms of silicon dioxide and 20 gms of titanium dioxide was added slowly and stirred for 10 minutes to effect a pigment grind of 5 to 6 on a standard Hegman grind gauge. The pigment slurry viscosity was reduced with 107 gms of methoxy methylated urea and then treated with 22 gms of silicon dioxide and 12 gms of an organic wax. Water was then added to the mixer as needed for proper grinding viscosity. This mixture was stirred for ten minutes to effect a 6+ Hegman grind. This mixture was then let down with the emulsion of Example I, approximately 400 gms, and was stirred with 2 gms of dimethylethanolamine until neutralized to a pH of 7–8.5. After filtering, the paint had a Brookfield viscosity of 2600 and an application solids content of 59.5 wt. percent.

A primer was prepared by adding 30 gms of butyl cellosolve, 26 gms of water solubilized emulsion which has a minimum film formation temperature (MFFT) range of 20°–30° C., 1 gm of 26% aqueous ammonium solution, 1 gm of low volatile amine, 6 gms of an alkaline neutralized maleic anhydride isobutylene adduct, 4 gms of a blend of nonionic emulsifiers based on ethyoxylated octylphenol containing from 9–40 moles of ethylene oxide, and 2 gms of defoamer to a Cowles mixer. To the mixer was further added 9 gms of zinc oxide, 140 gms of titanium dioxide, 35 gms of zinc molybdate, and 17 gms of mica, 23 gms of magnesium silicate, 16 gms of silicon dioxide and 350 gms of an acrylic emulsion with an MFFT range from 47°–57° C. The mixer was stirred for ten minutes to effect a 6 Hegman grind.

This pigment slurry was let down with a 185 gm combination of two acrylic emulsion resins one of which had an MFFT range of 47°–57° C. and the other of which had an MFFT range of 30°–45° C., the combination proportions of each resin being such as to yield an MFFT range with a midpoint of 45° C. The viscosity was adjusted with 50 gms of glycol ethers and reduced with 2 gms of an ammonium benzoate solution and 23 gms of water to 1600 cps, the mixture having an application solids content of 53 wt. percent. This primer was applied over sample substrates of Bonderite 1000 steel, aluminum, polyester, Lexan polycarbonate resin, Noryl thermoplastic resin, polystyrene and ABS. One set of samples was air dried for 15 minutes at ambient temperature and another set was baked for 5 minutes at 150° F. Both sets showed the same results.

The previously prepared topcoat was catalyzed with 70% aqueous paratoluene sulfonic acid to a pH between 1.5 and 2.5 and was then applied to the primed steel and primed plastic substrates using a pressure feed spray gun. The thickness of the primer and of the topcoat was each about 1.5–2.5 mils. The topcoat was air dried for ten minutes at room temperature and then baked at 150° F. for 30 minutes to yield a 1.5 mil thick coating over the primer. Gloss measured on a Gardner glossmeter of 17 at 60° C., Eagle pencil hardness of H, Gardner impact tester showing direct impact of 80 inch-pounds yielded slight cracking with no flaking, 4.5% elongation using a ⅛ inch conical mandrel and a 1,1,1-trichloroethane resistance of 50 double rubs with a solvent saturated cloth with no observable effect. The topcoat passed 95% crosshatch adhesion over Bonderite steel, aluminum, polyester, polystyrene, Lexan polycarbonate resin, and Noryl thermoplastic resin showed no blistering after 24 hours of water immersion, passed 250 hours of humidity testing and 100 hours of salt spray testing. It showed no effect on spot and rub tests with water, perspiration, fruit juice, machine oil, xylene, ink eradicator, ethyl alcohol, isopropyl alcohol, 1,1,1,-trichloroethane and naphtha. No adverse staining effects were observed from a wax marking pencil, lipstick, business machine ink, ball point pen ink and felt tip pen ink. There was no change of gloss after 100 hours in a fadeometer. The catalyzed topcoat will air dry at ambient temperatures in less than one day which can result in significant savings in coating process costs by eliminating the need for curing ovens. The air dried topcoat has been found to pass the 1,1,1-trichloroethane resistance test of 50 double rubs with a solvent saturated cloth after only three days of drying at ambient temperature.

EXAMPLE II

In this example, 556 gms of water were heated to 155° F. and nitrogen sparged in an apparatus as described in Example I. A monomer mixture consisting of 302 gms of water, 54 gms of nonionic emulsifier based on ethoxylated nonylphenol having an HLB of 17.8 and containing 40 moles of ethylene oxide, 19 gms of nonionic emulsifier based on ethoxylated nonylphenol having an HLB of 10.8 and containing 6 moles of ethylene oxide, 66 gms of acrylamide, 28 gms of methacrylic acid, 123 gms of styrene, 126 gms of methyl methacrylate, 452 gms of n-butyl methacrylate, 53 gms of hydroxyethyl methacrylate and 92 gms of ethyl acrylate were added together in a mixer and converted to a pre-emulsion by stirring.

An initiator solution was prepared by dissolving 1.9 gms of ammonium persulfate in 63 gms of water. An activator solution was prepared by dissolving 1.5 gms of sodium metabisulfate in 63 gms of water. An equal volume portion of initiator solution, pre-emulsion and activator solution were added to the resin flask and the emulsion mixture was processed as set forth in Example I.

Upon completion of the addition of the pre-emulsion, initiator and activator solutions, a separate solution of 0.6 gm of t-butyl hydroperoxide mixed with 0.6 gm of water and 0.6 gm of nonionic emulsifier based on ethoxylated nonylphenol containing 40 moles of ethylene oxide were added dropwise to the resin flask. The emulsion mixture was processed as in Example I to yield a 50 wt. percent resin with viscosity of 752 cps and a pH in the range of 2.5–3.5.

A topcoat paint mixture was formulated using 284 gms of the above emulsion mixture which was placed in a flask and neutralized in 0.85 gm of dimethylethanolamine by stirring for several minutes.

In a separate mixer, a pigment slurry was prepared by charging 98 gms of water, 11 gms of butyl carbitol, 11 gms of isopropanol, 19 gms of polyvinylpyrolidone, 5 gms of alkaline neutralized carboxylated resin, 1 gm of nonionic emulsifier based on ethoxylated octylphenol containing 40 moles of ethylene oxide and 3 gms of defoamer. To the mixture, 61 gms of silicon dioxide, 49 gms of methoxy methylated urea and 190 gms of titanium dioxide were added slowly and stirred for ten minutes to effect a grind of 5 to 6 on a standard Hegman grind gauge. The pigment slurry viscosity was reduced with 129 gms of water and then treated with 14 gms of an organic wax, 4 gms of phthalo blue and 41 gms of a glycol ether. The pigment slurry was then let down with the emulsion mixture of Example II and filtered. The resulting topcoat paint had a Brookfield viscosity of 3700 cps and a solids content of 55.3 wt. percent.

The paint was catalyzed with an acid to pH between 1.5 and 2.5 and was applied to primed Bonderite 1000 steel and primed aluminum panels using a pressure feed spray gun. The panels were air dried for ten minutes at room temperature and then baked at 150° F. for 30 minutes to yield a 3 mil thick film which had a reverse impact of 2% elongation, showed no blistering after 100 hours of humidity and no blistering after 24 hours of water immersion and exhibited no adverse effects from a 1,1,1-trichloroethane solvent resistance test of 50 double rubs with a solvent saturated cloth.

EXAMPLE III

As initially conceived, it was considered desirable to include an acid monomer to enhance stability during synthesis of the emulsion. However, in subsequent tests it was determined that instability during emulsion synthesis was not a serious concern and that the presence of the acid monomer could, in some instances, adversely affect the performance of the topcoat emulsion, particularly on moisture resistance tests. As consequence, it is now considered preferable that the acid monomer not be used during preparation of the emulsion, although some slight amount such as, for example, up to 2.0% by weight, might be included if desired to enhance stability during synthesis.

In this example, the emulsion was prepared without the inclusion of an acid monomer for stabilizing purposes. A surfactant mixture was prepared in accordance with the procedure described in Example I. A monomer mixture was then prepared as a pre-emulsion by stirring together in a flask 120 gms of water, 9 gms of nonionic emulsifier based on ethoxylated nonylphenols having an HLB of 17.8 and containing 40 moles of ethylene oxide, 3 gms of nonionic emulsifier based on ethoxylated nonylphenols having an HLB of 10.8 and containing 6 moles of ethylene oxide, 26 gms of acrylamide, 94 gms of styrene, 25 gms of methylmethacrylate, 144 gms of butyl methacrylate, 37 gms of hydroxyethyl methacrylate and 48 gms of ethyl acrylate. The mixture was stirred about ten minutes at ambient temperature to obtain the pre-emulsion condition. The remainder of the emulsion was prepared in accordance with the procedure of Example I.

A topcoat paint mixture was then formulated based on the emulsion mixture prepared as just described. On a separate Cowles mixer, a pigment slurry was prepared by charging 17 gms of monopropyl ether of ethylene glycol, 44 gms of methoxy methylated urea and 0.6 gms of titanate. To this mixture 9 gms of silicon dioxides, 28 gms of titanium dioxide, 54 gms of amorphous silica, 6.5 gms of ferric oxide and 7.2 gms of polyethelene wax were added slowly and stirred for 20 minutes to effect a pigment grind of 6+ on a standard Hegman grind gauge. The pigment slurry viscosity was reduced with a mixture of 24 gms of a highly alkolated polymeric methoxy methylated melamine, 27 gms of methanol and 1.2 gms of dimethylethanol amine. This mixture was added to the emulsion just described, approximately 400 gms, and rendered to a pH of 7–8.5. After filtering, the paint had a Brookfield viscosity of 2200 cps and an application solids content of 52.1 wt. percent.

The primer for this example was prepared by adding 47 gms of methyl ether of propylene glycol, 8 gms of an ammonium resin complex, 1 gm of nonionic alkyl aryl ether and 0.3 gm of octylphenoxy polyethoxyethanol to a Cowles mixer. To the mixture was added 71 gms of titanium dioxide, 28 gms of magnesium silicate, 14 gms of mica, 14 gms of aluminum silicate and 13 gms of 10% aqueous solution of ammonium benzoate. This mixture was stirred for 10 minutes to effect a 6 Hegman grind.

This pigment slurry was let down with 350 gms of the aforementioned A-655 latex and neutralized with 1.6 gms of ammonium hydroxide and reduced with 3 gms of 2,2,4-trimethylpentanediol-1,3 monoisobutyrate to a viscosity of 600 cps and an application solids content of 52.3%.

The topcoat paint prepared as just described was catalyzed with 80% aqueous paratoluene sulfonic acid to a pH between 1.5 and 2.5. This catalyzed topcoat paint had an unreduced pot life of greater than 8 hours at 25° C. when catalyzed up to 3.6 ml of catalyst per 100 gms of paint. The catalyzed paint was then applied to primed steel and plastic substrates as described for Example I with similar excellent results.

While in accordance with the patent statutes, there has been described what at present is considered to be preferred embodiments of the invention, it will be obvious to those skilled in the art that various changes and modifications may be made therein without departing from the invention. It is, therefore, intended by the appended claims to cover all such changes and modifications as fall within the true spirit and scope of the invention.

What is claimed is:

1. A metallic or plastic article having applied thereto a base coating, comprising a dried, non-acid catalyzed, thermoplastic polymer which has a glass transition temperature in the range of about 21° to 51° C. and a minimum film-forming temperature in the range of about 10°–55° C. and having applied over said base coating a top coating cured at temperatures below about 66° C., said top coating being formed from an aqueous coating composition consisting essentially of (a) about 52–78.5% by weight of an aqueous dispersion binder of polymerized ethylenically unsaturated monomers having a combined glass transition temperature in the range of about 26°–60° C., said binder being comprised of a copolymer of about 3–10% by weight of a hydroxy functional copolymerizable monomer, about 4–9% by weight of an amide functional copolymerizable monomer, about 0–2.0% by weight of an acid monomer, and about 93 to 79%, by weight of other monomers copolymerizable therewith, wherein the polymeric dispersion is stable in a pH range of about 1.0–10 and reactable with a crosslinking system; (b) about 1.5–8% by weight of a surfactant mixture containing at least about 50% by weight based upon the total mixture of nonionic surfactants, and the amount of surfactant in the composition being sufficient to render the composition dispersion stable throughout the pH range of about 1.0 to 10; and (c) about 40% by weight of a crosslinking system formed from a mixture of alkoxy alkyl urea-formaldehyde and alkoxy alkyl melamine-formaldehyde crosslinking agents.

* * * * *